US008379605B2

(12) United States Patent
Tiedemann, Jr. et al.

(10) Patent No.: US 8,379,605 B2
(45) Date of Patent: *Feb. 19, 2013

(54) METHOD AND APPARATUS FOR MAXIMIZING THE USE OF AVAILABLE CAPACITY IN A COMMUNICATION SYSTEM

(75) Inventors: Edward G. Tiedemann, Jr., San Diego, CA (US); Stein A. Lundby, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 11/862,877

(22) Filed: Sep. 27, 2007

(65) Prior Publication Data

US 2008/0062912 A1  Mar. 13, 2008

Related U.S. Application Data

(63) Continuation of application No. 09/955,662, filed on Sep. 19, 2001, now Pat. No. 7,292,553.

(51) Int. Cl.
*H04B 7/216* (2006.01)
*H04B 7/00* (2006.01)

(52) U.S. Cl. ......... 370/335; 370/336; 370/349; 455/522

(58) Field of Classification Search .................. 370/335, 370/342, 441, 522, 535, 310, 310.1, 310.2; 455/522, 69
See application file for complete search history.

(56) References Cited

U.S. PATENT DOCUMENTS

| 4,901,307 A | 2/1990 | Gilhousen et al. |
| 5,463,626 A * | 10/1995 | Hoff et al. ..................... 370/349 |
| 5,581,575 A | 12/1996 | Zehavi et al. |
| 5,592,469 A | 1/1997 | Szabo et al. |
| 5,638,371 A | 6/1997 | Raychaudhuri |
| 5,713,074 A | 1/1998 | Hulbert |

(Continued)

FOREIGN PATENT DOCUMENTS

| EP | 0913957 | 6/1999 |
| FI | 104142 | 4/1998 |

(Continued)

OTHER PUBLICATIONS

A Sampath, et al, "Access Control of Data in Integrated Voice/Data CDMA Systems: Benefit and Tradeoffs," IEEE Journal on Selected Areas in Communications, US, IEEE, Inc., New York, NY, (USA). vol. 15, No. 8, Oct. 1, 1997, pp. 1511-1526. cited by other.

(Continued)

*Primary Examiner* — Steven H Nguyen
(74) *Attorney, Agent, or Firm* — Rupit M. Patel

(57) ABSTRACT

A method and apparatus for maximizing the use of available capacity in a communication system. The forward link in the mobile radio system includes a plurality of traffic streams sent on at least one channel from the base station to the mobile stations. A first output power level associated with simultaneously transmitting a first set of traffic streams from the base station to the mobile stations on the forward link is initially determined. Next, the first output power level is compared to the maximum power ceiling. In response to the comparing step, at least one time frame in the forward link having available capacity for transmitting a portion of at least one further traffic stream is identified. The first set of traffic streams and the portion of the at least one further traffic stream are then transmitted simultaneously during the at least one frame on the forward link.

23 Claims, 5 Drawing Sheets

U.S. PATENT DOCUMENTS

| | | | |
|---|---|---|---|
| 5,742,594 | A | 4/1998 | Natarajan |
| 5,790,534 | A | 8/1998 | Kokko et al. |
| 5,889,815 | A | 3/1999 | Iwakiri |
| 5,892,769 | A | 4/1999 | Lee |
| 6,018,521 | A | 1/2000 | Timbs |
| 6,035,210 | A | 3/2000 | Endo et al. |
| 6,073,025 | A | 6/2000 | Chheda et al. |
| 6,084,904 | A | 7/2000 | Wang et al. |
| 6,111,857 | A | 8/2000 | Soliman et al. |
| 6,115,365 | A | 9/2000 | Newberg |
| 6,122,660 | A | 9/2000 | Baransky |
| 6,154,659 | A | 11/2000 | Jalali et al. |
| 6,181,684 | B1 | 1/2001 | Turcotte |
| 6,233,439 | B1 | 5/2001 | Jalali |
| 6,259,710 | B1 | 7/2001 | Junghans |
| 6,292,519 | B1 | 9/2001 | Popovic |
| 6,317,435 | B1 | 11/2001 | Tiedemann et al. |
| 6,393,000 | B1 | 5/2002 | Feldman |
| 6,404,776 | B1 * | 6/2002 | Voois et al. .................. 370/468 |
| 6,581,176 | B1 | 6/2003 | Seo |
| 6,625,132 | B1 | 9/2003 | Boettger et al. |
| 6,707,806 | B1 * | 3/2004 | Kato ............................. 370/336 |
| 6,798,762 | B1 | 9/2004 | Olson |

FOREIGN PATENT DOCUMENTS

| | | |
|---|---|---|
| JP | 3231523 | 10/1991 |
| JP | 8289367 | 1/1996 |
| JP | 10107800 | 4/1998 |
| RU | 2108673 | 4/1998 |
| WO | 9835514 | 8/1998 |

OTHER PUBLICATIONS

Z. Liu, "Channel Access and Interference in Multi-Code DS-CDMA Wireless Packet (ATM)Networks" Wireless Networks, US, ACM. vol. 2, No. 3, Aug. 1, 1996. pp. 173-192. cited by other.

R. Majoor, A MAC Protocol Wireless ATM Over CDMA, Sep. 7-8, 1998, IEEE pp. 155-160.

International Search Report PCT/US00/05795—International Search Authority—European Patent Office Oct. 27, 2000.

European Search Report—EP10172546, Search Authority—Munich Patent Office, Sep. 15, 2010.

* cited by examiner

METHOD AND APPARATUS FOR MAXIMIZING THE USE OF AVAILABLE CAPACITY IN A COMMUNICATION SYSTEM

CLAIM OF PRIORITY UNDER 35 U.S.C. §120

The present Application for Patent is a continuation of patent application Ser. No. 09/955,662, now U.S. Pat. No. 7,291,553, entitled "Method and Apparatus for Maximizing the Use of Available Capacity in a Communication System" filed Sep. 19, 2001, pending, and assigned to the assignee hereof and hereby expressly incorporated by reference herein.

BACKGROUND OF THE INVENTION

I. Field of the Invention

This invention relates to the field of communication systems and, in particular, to maximize the use of available capacity in a communication system where signals associated with multiple users may be simultaneously transmitted on a common channel.

II. Description of the Prior Art

Telecommunications traffic can be divided into a number of classes. One classification scheme divides the traffic based upon the rate at which the traffic is transmitted and the priority of the traffic. In accordance with this classification scheme, traffic is classified as constant bit rate (CBR) traffic, variable bit rate (VBR) traffic, or available bit rate (ABR) traffic. (CBR) traffic is afforded a fixed bit rate regardless of the requirements of the data that is to be transmitted. This is the most expensive type of service available. VBR traffic allows a user to decide the rate at which the traffic is sent for each communication. ABR traffic is the lowest priority traffic. ABR traffic is transmitted at whatever rate is available. Accordingly, ABR service is relatively inexpensive.

One example of traffic that is best sent using CBR service is conventional fixed rate circuit switched traffic. Examples of signals having the variable demands suitable for VBR service are speech and Internet video services. Both CBR and VBR traffic are usually real time with a relatively high quality of service requirement. The quality of service is an indication of the reliability that data will be successfully received as well as the delay involved in the reception. ABR traffic has a lower priority and does not provide high probability that the traffic will be delivered within a short time interval. Traffic suitable for ABR service includes file transfers and electronic mail transfers. If loading is not high, and delay is therefore not high, most world wide web transmissions use ABR service.

The forward link capability of a cellular communication system (i.e., the number of users and the bit rate of each user) is in part controlled by the capabilities of the power amplifier used to amplify the signals transmitted from the base stations of the system. For example, in a code division multiple access (CDMA) communication system, each of the traffic streams transmitted is assigned to a code channel. Details of an exemplary CDMA system can be found in U.S. Pat. No. 4,901,307 entitled "Spread Spectrum Multiple Access Communication System Using Satellite Or Terrestrial Repeaters", which is assigned to the assignee of the present invention and incorporated herein in its entirety by reference. Each channel in a CDMA system is modulated over a frequency band (which is the same for each code channel) and combined to form a CDMA channel. The amount of power required in each code channel depends upon the bit rate of traffic transmitted over that code channel, the gains of the antennas at the receiving station (such as a mobile station) and a transmitting station (such as a base station), the path loss (i.e., the amount of attenuation of the signal) between the base station and the remote station to which the information is sent, the noise level at the mobile station, and the performance of the modulation scheme used. The noise level at the mobile station includes thermal noise, noise from other cells that the mobile station is not receiving, and noise from non-orthogonal signal components from the cell that the mobile station is receiving. The CDMA channel is amplified by the power amplifier within the base station. The base station must transmit a total power sufficient for an intended receiving mobile station to receive the signals directed to it at the desired error rates. The base station uses various procedures so that the total amount of power required by the CDMA channel does not exceed the amount of power that the power amplifier can provide without undesirable distortion.

The forward link capability of a cellular communication system is also limited by the amount of interference from the user's own cell (from non-orthogonal components if the waveform is transmitted orthogonally as in TIA/EIA-95) and by the interference from signals transmitted by other cells. This provides a limit irrespective of the amount of power that the base station transmits. In this situation, increasing the base station's transmission power above some limits only marginally increases the capability of the system.

The maximum output power level of a base station is determined by a number of design parameters related to the power amplifier of the base station. Two relevant parameters of the power amplifier include power dissipation and unwanted emissions. Unwanted emissions are emissions that are outside the bandwidth of a transmitted signal. A large portion of the unwanted emissions occur due to intermodulation within the power amplifier. Intermodulation is a form of distortion. Intermodulation distortion increases as the power amplifier is driven closer to the maximum output of the amplifier. Regulatory bodies, such as the Federal Communication Commission often limit unwanted emissions. Industry standards can also set limits on unwanted emissions in order to avoid interference with the same system or another system.

In order to maintain unwanted emissions within the required limits, the output power capability of a power amplifier is selected to provide a very small probability that the unwanted emissions will exceed the required limit. When the requested power exceeds the maximum output power, a base station can limit the output power in order to maintain the unwanted emissions within the prescribed limits. However, the demand on the power amplifier is determined by the number of traffic streams that are transmitting at the same time. Each transmitted traffic stream can start and end arbitrarily. Therefore, it is difficult to determine the amount of power that the base station is required to transmit at any particular time.

An important measure in a communication system is the signal-to-noise ratio. In a digital communication system, the required signal-to-noise ratio is equal to the product of the bit rate and the required energy per bit divided by the total noise spectral density. The error rate of the communication system is often expressed in terms of the bit error rate or the frame error rate. The error rate is a decreasing function of the signal-to-noise ratio. If the received signal-to-noise ratio is too low, then the probability that an error will occur is very high. Thus, a communication system attempts to maintain the received signal-to-noise ratio at or above the required signal-to-noise ratio for the desired error rate.

Accordingly, in mobile radio communication systems such as CDMA systems, where multiple users simultaneously transmit on a common channel, the number of simultaneous VBR and CBR users permitted within telecommunication system is usually limited. The limit is selected to maintain a low probability of exceeding the maximum output power. When selecting the limits on the number of users, the variable rate nature of the VBR services and the dynamic power control on the forward link must be considered.

White the characteristics set forth above have been described in connection with the forward link, similar characteristics also apply to the reverse link.

SUMMARY OF THE INVENTION

A method for maximizing the use of available capacity in a communication system (such as a CDMA system) that uses a common frequency channel for simultaneously transmitting signals associated with multiple users is disclosed herein. In accordance with the disclosed method, a forward link in a mobile radio system supports a plurality of traffic streams associated with multiple users and is sent on at least one common channel from a transmitting station (such as a base station) to receiving stations (such as mobile stations). The forward link is subject to a maximum power ceiling. A first output power level associated with simultaneously transmitting a first set of traffic streams from the base station to the mobile stations on the forward link is initially determined. Next, the first output power level is compared to a maximum power ceiling. At least one time frame in the forward link having "available capacity" for transmitting a portion of at least one further traffic stream is identified. Having available capacity, means that the amount of power required to transmit the forward link is lower than the power level at which the forward link can be transmitted without undesirable distortion. The first set of traffic streams and the portion of the at least one further traffic stream are then transmitted simultaneously during the at least one frame on the forward link. The further traffic stream may optionally be transmitted discontinuously on the forward link and have a lower priority than the first set of traffic streams. Discontinuous transmission refers to the transmission over frames that are not adjacent to one another in time (i.e., frames which do not include the discontinuous stream are transmitted between frames that do include the discontinuous stream).

In accordance with a preferred embodiment, any available capacity on the forward link is allocated to a second set of traffic streams in which each member of the second set is transmitted discontinuously on the forward link by using one or more frames. In this embodiment, a second output power level is associated with simultaneously transmitting the group of frames from the second set of traffic streams on the forward link, and the sum of the first output power level (i.e., the output power level associated with transmitting the first set of traffic streams on the forward link) and the second output power level is no greater than the maximum power ceiling.

In a particularly preferred embodiment, the sum of the first and second output power levels is maintained at a constant level (preferably equal to the maximum power ceiling) over a plurality of time frames. When the present invention is implemented in connection with a fast forward link power control system, the power allocation determinations necessary to implement the invention are preferably made in a power manager located at a base station transceiver. Alternatively, in cases where the system includes a base station controller that services a plurality of base station transceivers, the power allocation determinations may be made in a scheduler located in the base station controller and then sent to the appropriate base station transceiver.

In accordance with a further aspect, in cases in which the available capacity on the forward link is present over a group of one or more frames and is allocated to a second set of traffic streams, at least one frame in the second set of traffic streams is initially transmitted on the forward link with a first symbol energy that is insufficient for correct demodulation by an intended receiving mobile station. In this embodiment, at least one frame in the second set of traffic streams initially transmitted with the first symbol energy is retransmitted at a later time with a further symbol energy that may also be insufficient by itself for correct demodulation by the intended receiving mobile station. The retransmission of the at least one frame is performed one or more times until the sum of the symbol energy received is great enough to permit correct demodulation by the intended receiving mobile station.

In cases where a frame is initially transmitted with a first symbol energy amount that is insufficient for correct demodulation by an intended receiving mobile station, that mobile station can determine that the received frame has been received incorrectly and inform the base station by use of a predetermined protocol. The protocol can be either a positive or negative acknowledgement protocol. In other words, the mobile station can either send an acknowledgement when it is able to correctly demodulate the information or, alternatively, the mobile station can send a negative acknowledgement each time it is unable to correctly demodulate the information. Since the base station can estimate the symbol energy of the information received at the mobile station, the mobile station may, but need not, send energy information back to the base station when either protocol is employed. Thus, the explicit transmission of additional energy information from the mobile station to the base station in order to select the power level for retransmission of the frame to the mobile station is optional in the present invention.

In accordance with a still further aspect, the first set of traffic streams includes at least one constant bit rate traffic stream and at least one variable bit rate traffic stream, and frames in the constant bit rate traffic stream and frames in the second set of traffic streams are offset in time with respect to each other. The group of frames in the second set of traffic streams may optionally include messages that have different lengths. In addition, each of the traffic streams may have a different frame length.

The aspect of the invention that initially transmits traffic information from a base station with a symbol energy that is insufficient for correct demodulation at an intended receiving mobile station, and then later retransmits the same traffic information from the base station with additional symbol energy that is also by itself insufficient for correct demodulation at the intended receiving mobile station, may be applied generally in forward or reverse link transmissions in order to achieve time diversity. In other words, this aspect of the invention may be used to transmit any traffic stream and not simply one of the specific traffic streams mentioned in the above embodiments.

BRIEF DESCRIPTION OF THE DRAWINGS

The features, objects, and advantages of the present invention will become more apparent form the detailed description set forth below when taken in conjunction with the drawings in which like reference characters identify corresponding elements throughout and wherein.

DETAILED DESCRIPTION OF THE INVENTION

Figure 1:
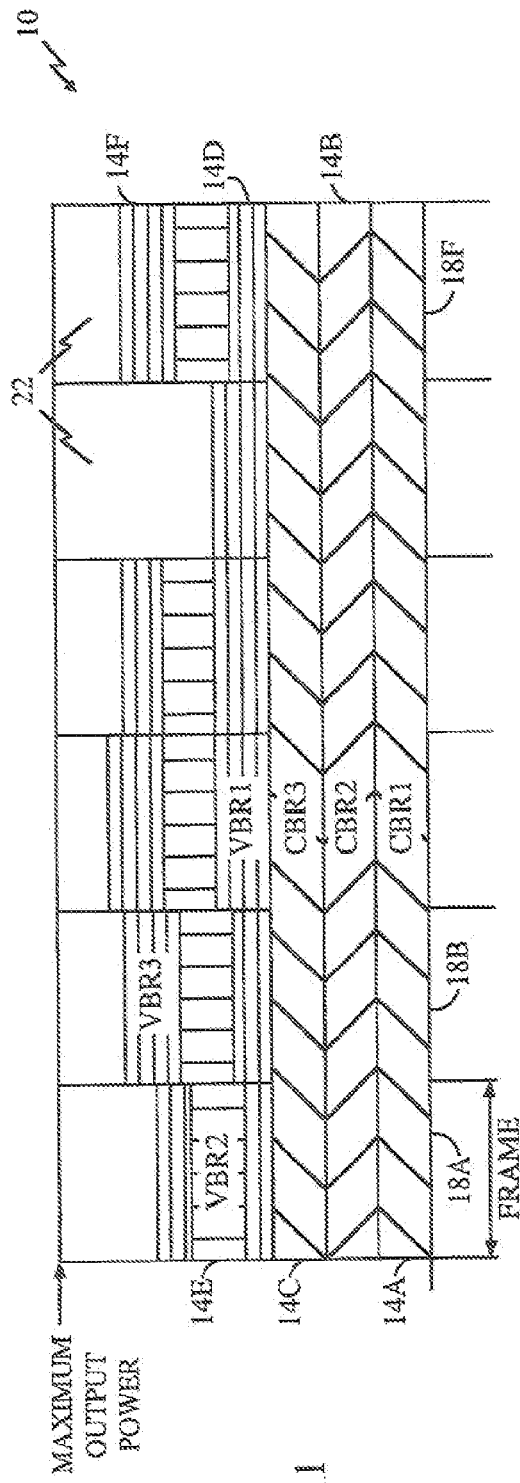
FIG. 1 shows a graphical representation of the traffic in the forward link of a cellular communication system for a period covering a plurality of time frames having available capacity.

FIG. 1 is a graphical representation 10 of the traffic in the forward link of a cellular communication system. The graphical representation 10 covers a time period that includes the time frames 18a-f. The time frames 18a-f can be, for example, twenty milliseconds in duration. The graphical representation 10 illustrates the use of a communication system to transmit forward link traffic that includes the three constant bit rate CBR traffic streams 14a-c. All CBR traffic streams 14a-c are transmitted during all of the time frames 18a-f. Additionally, three variable bit rate (VBR) traffic streams 14d-f are shown in the graphical representation 10. The VBR traffic streams 14d-f alternate between on and off states and have varying transmission rates during each time frame 18a-f.

Traffic streams 14a-f are all transmitted simultaneously on a common channel using for example, CDMA modulation. Within the forward link set forth by the representation 10, the time frame 18c is the most heavily loaded because the output power required of the base station is the greatest during the time frame 18c. More specifically, the time frame 18c requires more power than the other time frames 18a-f because of the requirements of the VBR traffic streams 14d-f. The time frame 18e is the most lightly loaded because the two traffic streams 14e, 14f require little power during the time frame 18e due to the relatively low bit rates. Unfilled areas 22 of the graphical representation 10 indicate unused power and therefore available capacity within the communication system set forth.

Figure 2:
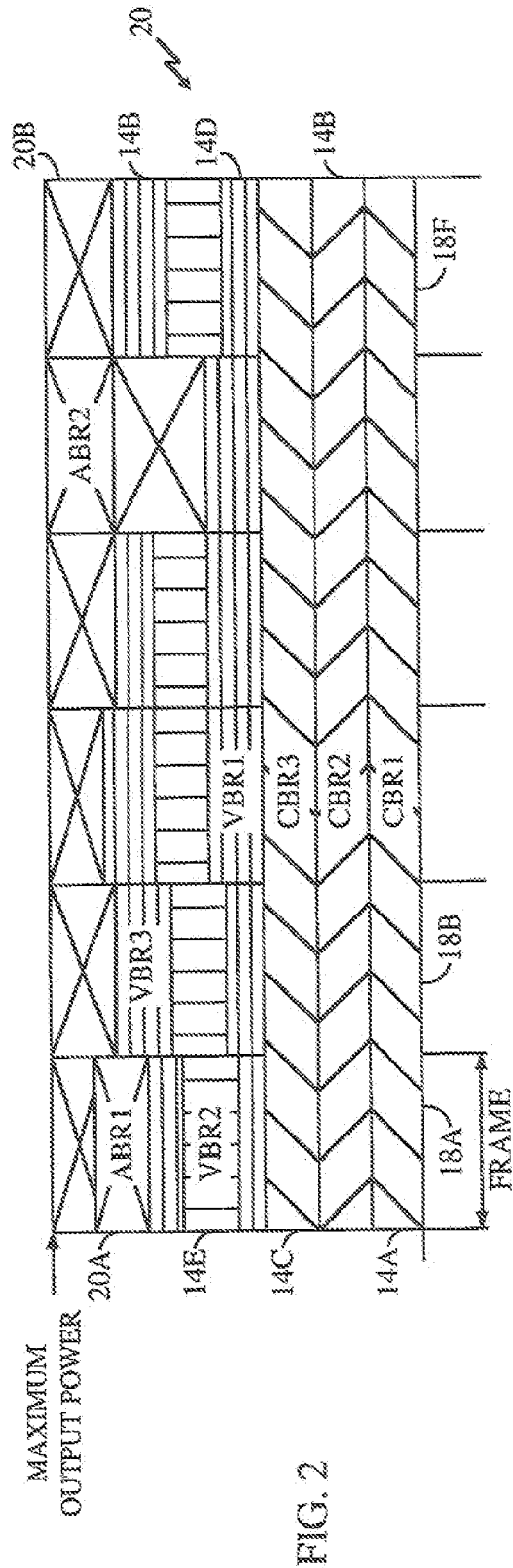
FIG. 2 shows a graphical representation of the traffic in the forward link of a cellular communication system for a period covering a plurality of time frames wherein all available capacity in the forward link has been allocated to ABR traffic.

FIG. 2 is a graphical representation 20 of the traffic in the forward link of a cellular communication system during a period covering the time frames 18a-f. The graphical representation illustrates the use of the communication system to transmit traffic. The transmitted traffic includes the three CBR traffic streams 14a-c and the three VBR traffic streams 14d-f. The traffic streams 14a-f are transmitted as previously described with respect to the graphical representation shown in FIG. 1. Additionally, the graphical representation of FIG. 2 shows ABR traffic streams 20a, b. It should be noted that the ABR traffic stream 20a has priority over the ABR traffic stream 20b. ABR traffic streams 20a, b are transmitted simultaneously on the same channel as traffic streams 14a-f using, for example, CDMA modulation.

The ABR traffic streams 20a, b use all of the remaining available base station output power as represented by the unfilled areas 22 of the graphical representation shown in FIG. 1. In this example, the base station loads the forward link with CBR and VBR traffic in every time frame 18a-f. The base station then determines which time frames 18a-f have additional capacity available for the transmission of the ABR traffic by comparing the power needed for transmission of the CBR and VBR during each such frame with the maximum output power value. The base station then schedules or transmits the ABR traffic in order to take advantage of the available transmit power which would otherwise remain unused. The transmission of the ABR traffic is performed consistent with the relative priorities of each of the ABR traffic streams. This scheduling method is possible in the example shown in FIG. 2 because the frame lengths of the CBR, VBR, and ABR traffic are identical. It should be understood that CBR or VBR streams can be used to fill in the available transmit power in the same manner as ABR streams provided that the quality of service requirements for these streams can be met.

The base station can apply different policies to determine how best to schedule or transmit the ABR traffic streams in order to take advantage of the available forward link transmit power that would otherwise remain unused. For example, after determining the power that will be required to transmit each of the various ABR streams buffered for transmission, the base station may simply select one or more ABR streams with power requirements that are likely to be equal to the available capacity. Alternatively, the base station may split the available capacity equally among all the ABR streams buffered for transmission. Furthermore, ABR streams may be transmitted discontinuously. Discontinuous transmission refers to the transmission over frames that are not adjacent to one another in time (i.e., frames which do not include the discontinuous stream are transmitted between frames that do include the discontinuous stream).

As explained more fully below, in scheduling the ABR streams for transmission, the base station may opt to transmit a given ABR stream at full power (i.e., at the power level that the base station estimates is required for correct demodulation of the transmitted information at the mobile station) or, alternatively, the base station may opt intentionally to transmit ABR traffic information initially at less than the full power required for correct demodulation and then, at a later time, retransmit the same traffic information again at less than full power. The mobile station receiving the multiple transmissions of the same traffic information will then combine (or sum) both transmissions on a symbol-by-symbol basis in a buffer in order to correctly demodulate the traffic information. In one embodiment, the base station allocates power among a number of different streams such that none of the streams are initially transmitted with enough power for correct demodulation by the intended receiver. By initially transmitting the traffic information at less than sufficient power to be correctly demodulated by an intended receiver and then retransmitting the same information at a later time, the base station is able to achieve time diversity in connection with the ABR transmissions. In a fading environment, this lowers the total required $E_b/N_0$. Other parameters that the base station can adjust in connection with allocating the otherwise unused power are the transmission rate and the code rate of the transmitted stream.

One advantage of completely filling the forward link in the manner described above is that the total power $I_{or}$ transmitted by a base station on the forward link is constant. Consistency in the loading of the forward link can simplify forward power control. However, it is not necessary to use all of the available capacity on the forward link. Furthermore, even if all of the available capacity is used, it is not necessary to fill the remaining power entirely with ABR traffic stream(s). For example, if there is sufficient power to allow additional CBR or VBR traffic streams to be transmitted over the forward link, then in one example, the available capacity can be used to transmit such a CBR or VBR traffic stream.

Figure 3:
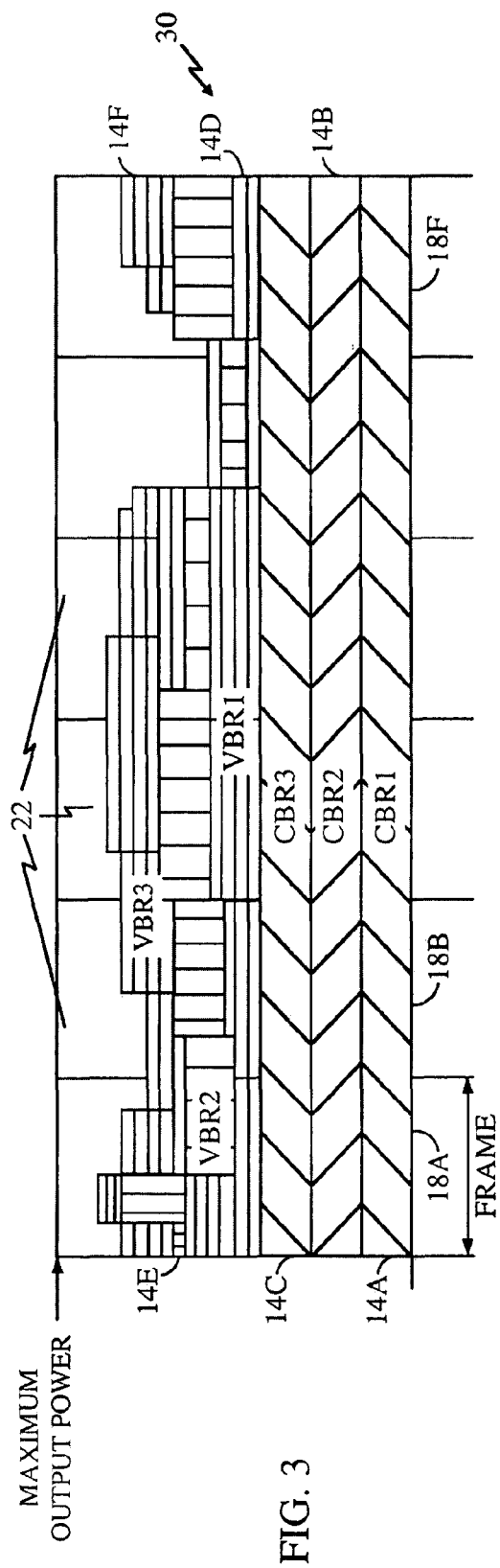
FIG. 3 shows a graphical representation of the traffic in the forward link of a cellular communication system for a period covering a plurality of time frames wherein time offsets are applied to transmission signals.

FIG. 3 is a graphical representation 30 of the traffic in the forward link of a cellular communication system during a period covering the time frames 18a-f. The graphical representation 30 illustrates the use of a communication system to transmit traffic including the three CBR traffic streams 14a-c and the three VBR traffic streams 14d-f. Traffic streams 14a-c are transmitted as previously described with respect to the graphical representations 10, 30. However, within the graphical representation 30, the frames of the VBR traffic streams 14d-f are offset with respect to the time frames 18a-f. The frame offsets in graphical representation 30 reduce peak processing, (i.e., the amount of information that must be processed at the same time), peak backhaul usage (the amount of information that must be communicated to other infrastructure components, such as base station transceivers (BTSs) and base station controllers (BSCs)), and delay within a communication system. Frame offsets of this type are well known.

In addition, the offsets shown in FIG. 3 cause the total required transmit power within time frame 18a-f to vary substantially. In CDMA radio telephone systems operating in accordance with the TIA/EIA Interim Standard entitled "Mobile Station—Base Station Compatibility Standard for Dual-Mode Wideband Spread Spectrum Cellular System", TIA/EIA/IS-95, dated July 1993, the contents of which are also incorporated herein by reference (the IS-95 standard), there are sixteen possible time offsets within a time frame 18a-f. The transmit power level can therefore vary up to sixteen times within each frame. When the transmit power level varies sixteen times there is some statistical averaging of the load because the number of traffic streams is large. Nevertheless, there is still substantial variability in the transmit power level. This can make the allocation of power for the ABR streams 20 a, b very difficult. However, very fast power control methods are available. The power control methods typically operate at eight hundred times per second per stream and therefore increase or decrease the required transmit power per stream every 1.25 milliseconds. A system for fast forward link power control is disclosed in U.S. patent application Ser. No. 08/842,993, entitled "METHOD AND APPARATUS FOR FORWARD LINK POWER CONTROL," which is owned by the assignee of the present application and the contents of which are incorporated herein by reference.

Frames 18a-f of the graphical representations 10, 20, 30 are all of the same duration. In the preferred embodiment they are 20 ms in duration. Additionally, frames of different lengths can be used. For example, frames having a 5 ms duration that are intermixed with the frames of length 20 ms can be used. Alternatively, frames having a longer duration, such as 40 ms can be intermixed with frames of length 20 ms.

Figure 4:
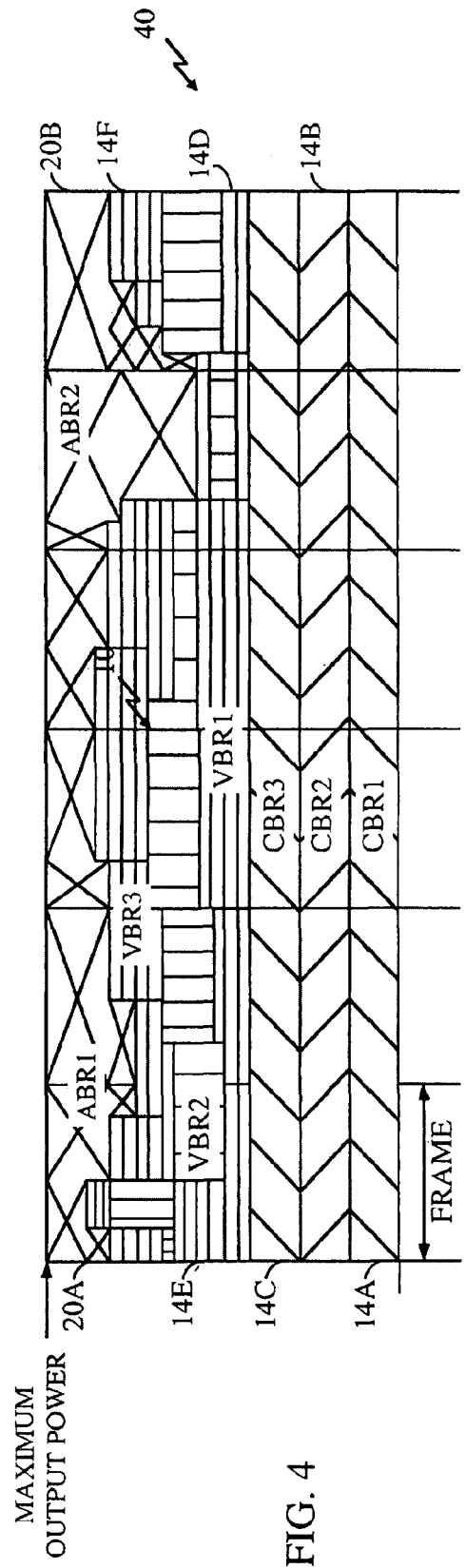
FIG. 4 shows a graphical representation of the traffic in the forward link of a cellular communication system for a period covering a plurality of time frames wherein a predetermined scheduling policy is applied.

FIG. 4 is a graphical representation 40 of the traffic in the forward link of a cellular communication system for a period covering the time frames 18a-f. The graphical representation 40 illustrates a scheduling policy adapted to maintain the base station output power level at a constant level. As was the case with the system shown in FIG. 2, in the system shown in FIG. 4 the base station schedules ABR traffic streams 20a, 20b in order to take advantage of the available transmit power (i.e., blocks 22 shown in FIG. 3) which would otherwise have remained unused. The transmit power level of the ABR traffic streams 20 a, b can be dynamically adjusted in order to maintain the output power constant. Thus, the base station can reduce the power of the ABR traffic streams 20 a, b if it has insufficient available capacity. The adjustment can be made in the middle of a 20 ms frame. As a result, the transmit power level of the ABR traffic streams 20 a, b can be lower than required for adequate reception when using the dynamic adjustment. Similarly, the base station can increase the power of the ABR traffic streams 20a, 20b if the base station has available capacity. The various scheduling policies discussed above in connection with FIG. 2 may also be applied in the context of the system shown in FIG. 4.

Turn now to the disclosed method mentioned above, in which the base station intentionally transmits ABR traffic information initially with less than sufficient power required for correct demodulation by an intended receiver. Those skilled in the art will understand that successful transmission of a bit of information in a communication system requires a minimum energy per bit/noise spectral density, $E_b/N_0$. The probability of a bit error is a decreasing function of $E_b/N_0$. A frame consists of a number of bits. A frame is in error if any of the bits in the frame is in error. In an uncoded communication system, a high enough $E_b/N_0$ is required for every bit in order for the frame not to be in error. However, in coded and interleaved systems the requirement does not necessarily apply to each bit. Rather, these systems typically require a minimum average $E_b/N_0$. The average energy level actually required in coded and interleaved systems can depend upon the duration of the averaging, in particular the coding and interleaving, and the amount of energy received at various times.

Coding and interleaving are typically used to counter the effects of fading that often occur in transmission channels. In communication systems compatible with the IS-95 standard, the coding and interleaving are performed over the duration of a 20 ms frame. Thus, in systems of this type the total energy received per frame is an important quantity. Therefore, it is important for understanding the relevance of the graphical representations herein and the system and method of the present invention that a more detailed description of the transmission energy and error rates be provided.

The total energy received per frame can be represented as $E_t/N_0$. If there are N coded symbols per frame, each with equal $E_s/N_0$, then:

$$E_t = N E_s/N_0$$

where $E_s$ is the energy of a symbol.

Let $(E_s/N_0)_{rki}$ be the received $E_s/N_0$ for the ith symbol of the kth frame. Furthermore, let $(E_t/N_0)_{rk}$ be the received energy in the kth frame. Then the energy to spectral noise density received during the kth frame can be expressed as:

$$(E_t/N_0)_{rk} = \sum_{i=0}^{N-1}(E_s/N_0)_{rki}$$

The probability that the kth frame is correctly received (i.e., that the kth frame is received with sufficient energy to permit correct demodulation by an intended receiver) is proportional to $(E_t/N_0)_{rk}$. Thus, if $(E_t/N_0)_{rk}$ exceeds a predetermined value there is a high probability that the kth frame is received correctly. The $E_s/N_0$ that is received at the mobile station can be determined from $P_rC/N_0/R$, where $P_r$ is the received power, C is the code rate, and R is the transmission rate. Alternatively, the $E_s/N_0$ can be determined by any one of the many techniques known to those skilled in the art. In the case of a system such as an IS-95 system, $E_s$ is the energy per symbol received on a code channel and $P_r$ is the power received on the code channel.

When the transmit power of an ABR traffic stream is permitted to vary, either the bit rate or the received $E_s/N_0$ must vary. Rapid varying of the transmitted power of an ABR traffic stream is desired in order to maintain a high base station output power level. However, it is difficult to reliably signal the new transmitted rate to the mobile station. For an IS-95 type system the output power level can change every 1.25 milliseconds as previously described. Thus, the received $E_s/N_0$ can be made to vary, and, accordingly, the $(E_t/N_0)_{rk}$ can vary. The base station wastes power if it transmits at a power level sufficient to make $(E_t/N_0)_{rk}$ large enough to provide a very small error probability. Alternatively, if the base station transmits at a power level that is too low it can cause the error probability in the frame to be too high.

A base station can estimate the received $(E_t/N_0)_{rk}$ at a mobile station based upon the amount of power transmitted on the code channel. The base station can perform this estimation by summing the coded symbol energies that are transmitted on the code channel. Since the total $(E_t/N_0)_{rk}$ is a good indication of the probability of correct frame reception, the base station can determine whether it has transmitted a high enough energy level to have the desired probability of correct reception. If the transmitted energy level is not high enough, the base station can increase its transmit power level during the later parts of the frame in order to compensate and approach the desired transmitted $(E_t/N_0)_k$. Likewise, if the base station transmits more energy than necessary in the early part of the frame, it can reduce the amount of energy later in the frame and apply the saved energy to the remaining code channels. The base station is not required to actually compute $(E_t/N_0)_{rk}$, the base station can, instead, compute a normalized transmitted symbol energy value. The base station can determine the required normalized total transmitted energy per frame using any method known to those skilled in the art.

As described below, the present invention can be used without the explicit transmission of additional energy information from the mobile station to the base station. In particular, the mobile station can determine whether the received frame is received correctly or not and perform an acknowledgment protocol with the base station. The protocol can be either a positive or negative acknowledgement protocol. In other words, the mobile station can either send an acknowledgement when it is able to correctly demodulate the information or, alternatively, the mobile station can send a negative acknowledgement each time it is unable to correctly demodulate the information. Two exemplary acknowledgment protocols that may be used in connection with the present invention are discussed below in connection with FIGS. 5 and 6. If past power control is being used, the base station can estimate the symbol energy of the information received at the mobile station. Then the mobile station may, but need not, send energy information back to the base station when either protocol is employed. Thus, the transmission of such energy information from the mobile station back to the base is optional in the present invention.

Dynamically varying the amount of transmitted power can adversely affect the demodulation process in the mobile station receiver. In the receiver, the optimal process is weighting the accumulated symbol amplitude by the signal to noise ratio for each symbol. Such a weighting process is described in U.S. Pat. No. 6,101,168 entitled 'METHOD AND APPARATUS FOR TIME EFFICIENT RETRANSMISSION USING SYMBOL ACCUMULATION,' which is owned by the assignee of the present invention and the contents of which are hereby incorporated herein by reference. In most IS-95 implementations, the weighting uses the common pilot signal because the code channel power is constant over a frame and the pilot $E_c/I_0$ is a scaled value of the signal to noise ratio. With fast forward link power control (as described in U.S. patent application Ser. No. 08/842,993 cited above), the power can be varied in a frame so that the power of a code channel is not in constant proportion to the common pilot signal. Power variations within a frame are not a problem because the mobile station can develop an appropriate weighting if necessary. However, when the base station reduces the transmitted energy of a code channel in order to use it on one or more other code channels, the weighting can be very different and the mobile station may not be aware of the power that the base station is using. For example, the weighting applied to the ABR stream 14*f* of the graphical representation 30 at the end of the first frame can be much greater than that applied at the end of the third frame. It will be understood that a large amount of power is transmitted for the stream at the end of the first frame and that little power is transmitted at the end of the third frame. For an accurate weighting in such situations, the mobile station can estimate the energy and noise in the received symbols and apply the appropriate weighting.

Rather than using the common pilot channel for weighting as described in the paragraph above, it is also possible to develop the weighting using a dedicated pilot channel. A dedicated pilot channel is a pilot that is directed to a specific mobile station. The dedicated pilot power would be part of the power that is being transmitted to the specific mobile station. With the dedicated pilot, it may be possible to adjust the pilot level in proportion to the transmitted power on the data channel. A drawback of this approach is that it has the impact of increasing the variance of the phase estimator, thus degrading the performance. Moreover, the dedicated pilot channel approach for weighting may not work if there are non-ABR services being transmitted to the mobile station, and such non-ABR services require a high pilot level for proper performance. In such cases, the level of the dedicated pilot will be maintained at a high level, thereby wasting power and precluding the use of the dedicated pilot channel for development of the weighting.

Under the above conditions the mobile station may not receive the ABR traffic stream with sufficient power to demodulate the stream with few enough errors (i.e., to demodulate the stream correctly). The mobile station can use a combination of checking the cyclic redundancy check (CRC) bits, testing the re-encoded symbol error rate, and checking the total received energy in order to determine whether the frame is significantly erred. Other techniques known by those skilled in the art can also be used.

In accordance with the present invention, when a frame is determined to be in error, the mobile station stores the received code symbols for the frame in a buffer. In accordance with one embodiment of the present invention, the mobile station then computes $(E_t/N_0)_k$ based upon the energy received in the frame. The amount of additional $(E_t/N_0)_k$ required for the frame to be demodulated with the required error rate can then be estimated. The mobile station sends to the base station a negative acknowledgment and may include such an estimate of the amount of additional $(E_t/N_0)_{rk}$ required. The total required $(E_t/N_0)_k$ can be estimated in this power control method based upon the outer loop power required (or the threshold) for the fundamental channel or DCCH channel. U.S. patent application Ser. No. 08/842,993 (cited above) discloses a method for estimating the total required $(E_t/N_0)_k$ based upon the outer loop power required. Alternately, there can be a separate outer loop power control method for the channel being used. It will be understood that if the frame is received incorrectly (i.e., with an undesirable number of errors), then $(E_t/N_0)_k$ is insufficient. Thus, the optimum power level can be determined by conditional statistics that take into account the fact that previous attempts were received incorrectly. Instead of sending the amount of additional $(E_t/N_0)_k$ that is required, the mobile station can send the amount of $(E_t/N_0)_{rk}$ that was received to the base station. The mobile can also include an estimate of the amount that it expects to need for correct demodulation in information sent to the base station.

Figure 5:
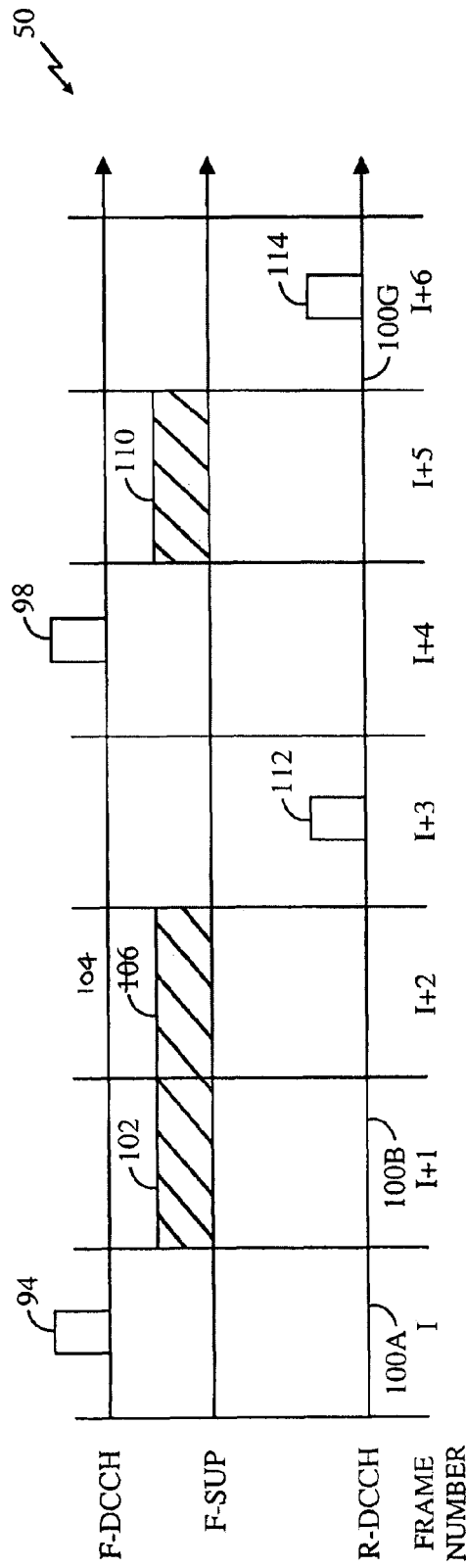
FIG. 5 shows a scheduling time line of an acknowledgment protocol between a base station and a mobile station of a communication system suitable for implementation in the system of the present invention.

FIG. 5 is a graphical representation 50 showing a scheduling time line of an acknowledgment protocol between a base station and a mobile station of a communication system suitable for implementation of the method of the present invention. The acknowledgement protocol of the graphical representation 50 can be used in a power control method as set forth above.

A preferred embodiment of the method of the graphical representation 50 can be implemented in an IS-95 third generation system. In the IS-95 third generation system a supplemental channel (F-SCH) can be used for transmission of the ABR traffic streams on the forward link. The supplemental channel is typically a scheduled channel, though it can also be a fixed or a variable rate channel. The F-DCCH and R-DCCH are forward and reverse control channels respectively. When the supplemental channel (F-SCH) is used for transmission of the ABR traffic streams on the forward link in accordance with the present invention, the error rate of the DCCH channels is typically lower than that of the supplemental channel (F-SCH). In the acknowledgement protocol of graphical representation 50, the base station transmits the schedule in medium access control (MAC) messages 94 and 98 to the mobile station. The schedule informs the mobile station of a number of aspects of the transmissions, which can include, but are not limited to, the number of frames that will be transmitted, their transmission rates, when they will be transmitted, and their frame numbers. In one embodiment of the invention, the MAC message 94 only provides the mobile station with the transmission rate that will be used. With this embodiment, the mobile station continually attempts to receive the F-SCH.

The base station indicates that two radio link protocol (RLP) frames 102, 104 must be sent to the mobile station. RLP is the upper layer framing protocol of the communication system. An RLP similar to that described in TIA standard IS-707 can be used, though many different upper layer framing protocols can be used. In what follows, an RLP frame is assumed to map exactly to a physical layer frame though that is not necessary as part of this invention. The sequence numbers of the RLP frames 102, 104 are k and k+1, respectively. The RLP frames 102, 104 are transmitted during the physical frames i+1 and i+2, respectively. When the mobile station correctly receives the transmission of the RLP frame k+1 (104), it acknowledges the frame using message 112. Since the base station does not receive an acknowledgement of the RLP frame k (102), the base station sends a new forward link assignment in the MAC message 98 indicating that the RLP frame k is scheduled for retransmission during the physical frame i+5 (110). The mobile station learns from the MAC message 98 that it must combine the signal received during frame i+5 (110) with the signal received during frame i+1 (102). After physical frame i+1 is retransmitted during the physical frame i+5, the mobile station combines the received energy for each symbol in the retransmitted physical frame i+5 with the received energy of the original transmission during frame i+1 (stored in the buffer as described above) and decodes the combined received energy of the frames as described herein.

The mobile station acknowledges the RLP frame k during the frame i+6 using the acknowledgement message 114. With this acknowledgement based method, the energy deficit is not transmitted to the base station. Moreover, in further embodiments, the energy deficit may be sent to the base station with the acknowledgement of the RLP frame k+2. Thus, in this embodiment, the acknowledgement always carries the estimate of the amount of additional $(E_t/N_0)_k$ required from the first frame that was in error. However, this method may not work well if the last frame in a sequence of frames is not received correctly by the mobile station.

When the base station determines that an acknowledgement was not received from the mobile station and it desires to retransmit the message, the base station determines the level at which to transmit the message. The base station can choose a level based upon the feedback information on the amount of required energy needed by the mobile station. Alternatively, the base station can estimate the amount of energy that the mobile station has already received and use this to determine the level at which to re-transmit. The power level chosen for retransmission will, in one embodiment, correspond to a minimum power level needed for correct demodulation when the symbol energy of the original message and the retransmitted messages are combined in the receiver buffer. The base station can form an estimate of the amount of energy that the mobile station has already received using information from forward power control, the transmission rate, the propagation conditions, the amount of power already used to transmit the frame, and the path loss. The actual information used in developing this estimate can include these or any other parameters which are available to the base station. Alternatively, the base station can just transmit a fixed power (or fixed power relative to the forward power control level) to the mobile station. This fixed power level could have been predetermined by the base station.

Instead of the explicit method of the base station transmitting message 98 to the mobile station to provide the identity of a retransmitted frame, the mobile station can alternatively implicitly determine the identity of the retransmitted frame with a reasonably degree of accuracy from the transmitted data. For example, the Euclidean distance can be used to determine whether frame i+5 matches the data received in previous frames that have not been acknowledged, such as frame i+1. Thus, the explicit retransmission of message 98 is not required for this invention. In this alternative embodiment, the mobile station compares the received symbols from the current frame with symbols from all previous frames stored in the mobile station's buffer. If the mobile station determines that the retransmitted frame corresponds to a frame already within the buffer, the mobile station combines the energies for each symbol and attempts to decode the frame.

In an alternative embodiment of the protocol shown in FIG. 5, message 94 is not required. Message 94 is used in the embodiment described above to provide an indication to the mobile station that frames 102 and 104 are to be transmitted. In this alternative embodiment, the mobile station can alternatively determine implicitly whether the current frame is a new frame or a retransmitted frame with a reasonably degree of accuracy from the transmitted data using the Euclidean distance analysis described previously.

Figure 6:
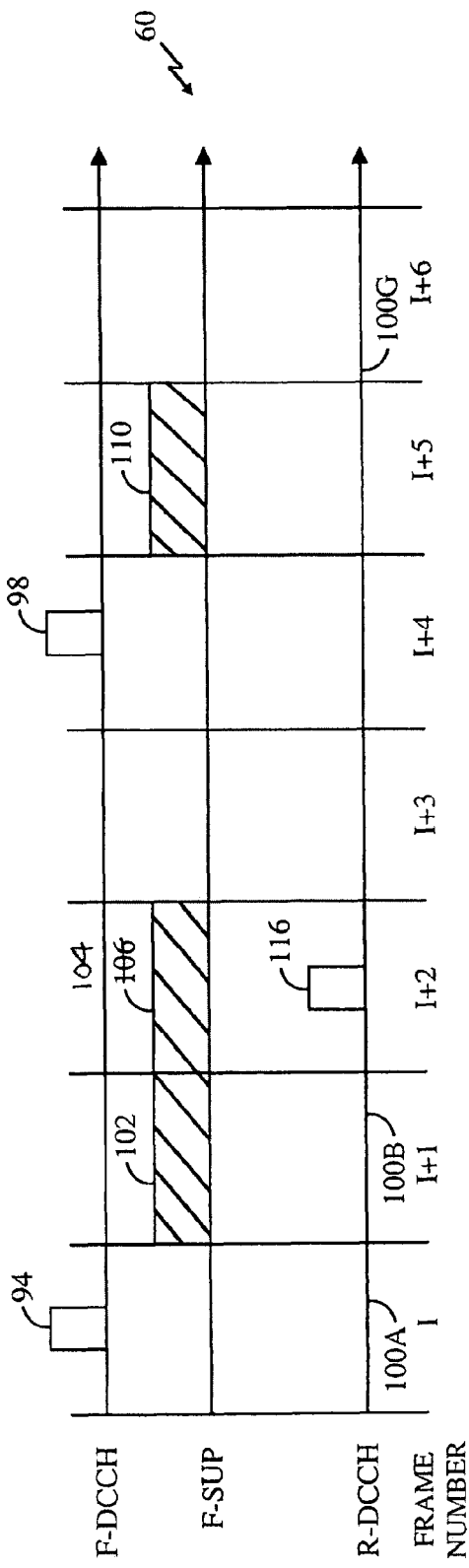
FIG. 6 shows a scheduling time line of a negative acknowledgment protocol between a base station and a mobile station of a communication system suitable for implementation in the system of the present invention.

FIG. 6 is a graphical representation 60 showing a scheduling time line of a negative acknowledgement protocol between a base station and a mobile station suitable for implementation in the system of the present invention. The negative acknowledgement protocol of the graphical representation 60 can be used in a power control method as set forth above.

In the negative acknowledgement protocol of graphical representation 60, the base station informs the mobile station of the RLP frames 102, 104 to be transmitted and the physical layer frames to be transmitted by means of the MAC message 94. The base station then sends the frames 102, 104 to the mobile station. If the mobile station does not receive the RLP frame 102 correctly, the mobile station sends a negative acknowledgement 116 to the base station. The base station then sends message 98 as previously described and the information of the frame 102 is retransmitted as the frame 110.

One of the disadvantages of the negative acknowledgement based protocol is that the base station is not able to take action to retransmit frame 102 if the negative acknowledgement is not received from the mobile station. For ABR traffic, the probability that a frame transmitted on the forward link is in error is much greater than the probability that the negative acknowledgement sent on the reverse link is in error. This is because the amount of power required to transmit a frame with many bits on the forward link is considerably higher than the amount of power required to transmit an acknowledgment. The negative acknowledgment protocol can use a MAC message 98 to indicate that the frame is being retransmitted. The MAC message 98 can be similar to that used for the acknowledgement protocol shown in FIG. 5. The negative acknowledgement protocols can also use an implicit method for determining the identity of a retransmitted frame that is similar to that described for the acknowledgment protocol shown in FIG. 5.

Several alternate embodiments of the negative acknowledgement based protocol are possible. In one alternate embodiment, the base station does not inform the mobile station about the frames of the original transmission and does inform the mobile station of time intervals wherein the frames can be sent. The mobile station demodulates all of the physical frames. If the mobile station correctly receives the RLP frame k+1, it transmits a negative acknowledgement for the missing frames (which includes the kth frame) on the R-DCCH. A disadvantage of this protocol is that the mobile station does not know when to release memory used to store the symbol energies from the various frames. This disadvantage can be addressed in several ways. One way is providing a fixed amount of memory and having the mobile station discard the oldest received physical layer frame symbol energies when it needs additional memory. Alternatively, the mobile station can discard memory corresponding to a physical layer frame that was received more than a predetermined time in the past.

A further disadvantage of this protocol is that the mobile station may not have information about when to send a negative acknowledgement promptly for frames that are received in error. This disadvantage is compounded by the fact that only a few frames may be received correctly on the first transmission. This disadvantage can be overcome if the base station occasionally transmits a second done message to the mobile station on the F-DCCH. This done message informs the mobile station that the base station has transmitted a sequence of frames, thus permitting the mobile station to determine the frames which it should have received. The mobile station can then send a negative acknowledge message for the frames that it did not receive. Any done message can be combined with any other message, such as a message that indicates that the frames will be transmitted.

Significantly, when a frame is initially transmitted with insufficient energy to permit correct demodulation by the intended receiver, as described above, and then retransmitted, the retransmission provides time diversity. As a result, the total transmit energy of the frame (including retransmissions) is lower. In other words, the combined symbol energy for both the initial transmission and retransmission(s) of the frame is lower than the energy that would have been required to transmit the frame initially at full power (i.e., at a power level that was sufficient on its own to permit correct demodulation by the intended receiver). This can be determined because the required $E_b/N_t$ for a predetermined bit error rate or frame error rate is lower when this method of retransmission is used.

Furthermore, it will be understood that the fast forward link power control (as described in U.S. patent application Ser. No. 08/842,993 cited above) is less important in the case of ABR traffic streams that utilize the retransmission approach described above. The fast forward link power control is less important because the retransmission approach is a form of power control. In addition, fast forward link power control may be less important when the retransmission approach is being employed, because fast forward link power control attempts to maintain the $E_b/N_t$ constant at the mobile station. Thus, it may be preferable to not use fast forward power control for ABR services.

In the case of the forward link, the base station adjusts its transmit power to the channel when it is unable to supply additional power for the channel from the base station. This can occur, for example, when a VBR user or a set of VBR users, a higher priority stream a (CBR or VBR stream), or a set of high priority streams require more transmit power due to different path losses or propagation conditions, or when the forward link path loss increases between the mobile unit and the base station.

The present invention has been described above with respect to variations in base station loading for transmitting forward link services such as CBR and VBR streams and variations due to power control. However, it will be understood that the invention can be advantageously applied to other situations including transmissions on the reverse link.

In the case of the reverse link, an important parameter is the rise in the level of the total amount of noise over the level of the thermal noise at a base station (referred to hereafter as the "rise over thermal"). The rise over thermal corresponds to the reverse link loading. A loaded system attempts to maintain the rise over thermal near a predetermined value. If the rise over thermal is too great the range of the cell is reduced and the reverse link is less stable. A large rise over thermal also causes small changes in instantaneous loading that result in large excursions in the output power of the mobile station. However, a low rise over thermal can indicate that the reverse link is not heavily loaded, thus potentially wasting available capacity. It will be understood by those skilled in the art that methods other than measuring the rise over thermal can be used to determine the loading of the reverse link.

ABR traffic streams can also be allocated available capacity on the reverse link to keep the rise over thermal more constant. The base station can control the reverse link transmission with a form of high rate RLP control. The third generation of IS-95 has a single power control stream that controls the pilot, the R-FCH, the R-SCH, and the R-DCCH simultaneously. Slower signaling is used in this IS-95 embodiment to control the power allocation between the channels. Typically the R-SCH requires most of the transmit power since it is carrying the high rate data stream. If all channels are controlled by the high rate power control stream, then when the base station requires a reduction of the power on the R-SCH in order to control loading, the power of all channels is reduced. This is not desirable because the pilot, the R-FCH, and the R-DCCH can be received by the base station at a level that is too low.

A separate high rate power control channel from the base station to the mobile station can be used for reverse link power control on an IS-95 third generation system. The power control rate for the reverse link can be eight hundred bits per second. While the same rate can be used to control the R-SCH independently of the other channels, the 800 bps rate requires more base station transmission power than necessary. Thus, the power control rate for the R-SCH can be somewhat lower because it does not have to be maintained perfectly in fading conditions. Furthermore, the power control for the R-SCH can be at an offset with respect to the main power control stream that controls the R-SCH, the R-DCCH, and the pilot. A signaling message or other signaling scheme can be transmitted to the mobile station to provide this relative power control in lieu of a power control bit stream.

In an alternative embodiment, a separate low rate power control stream can be used to provide a correction to all mobile stations relative to their own individual power control streams. This can be a binary stream specifying an increase or decrease in power for mobile stations relative to their own individual power control streams. This can also be a three level method that can indicate increase, decrease or do not change. Additionally, any other known power control scheme can be used for the separate low rate power control.

The disclosed method can also be used when a mobile station has insufficient power to transmit all of the streams to be transmitted to an intended receiver at a receive power level that allows correct demodulation. In such a case, the mobile station can reduce the transmitted power on the R-SCH to attempt to maintain the R-FCH and R-DCCH at the desired output power level. This method is similar to a method used on the forward link. Since the base station will receive some power from the mobile station, the amount of power required during the retransmission will be less.

Figure 7:
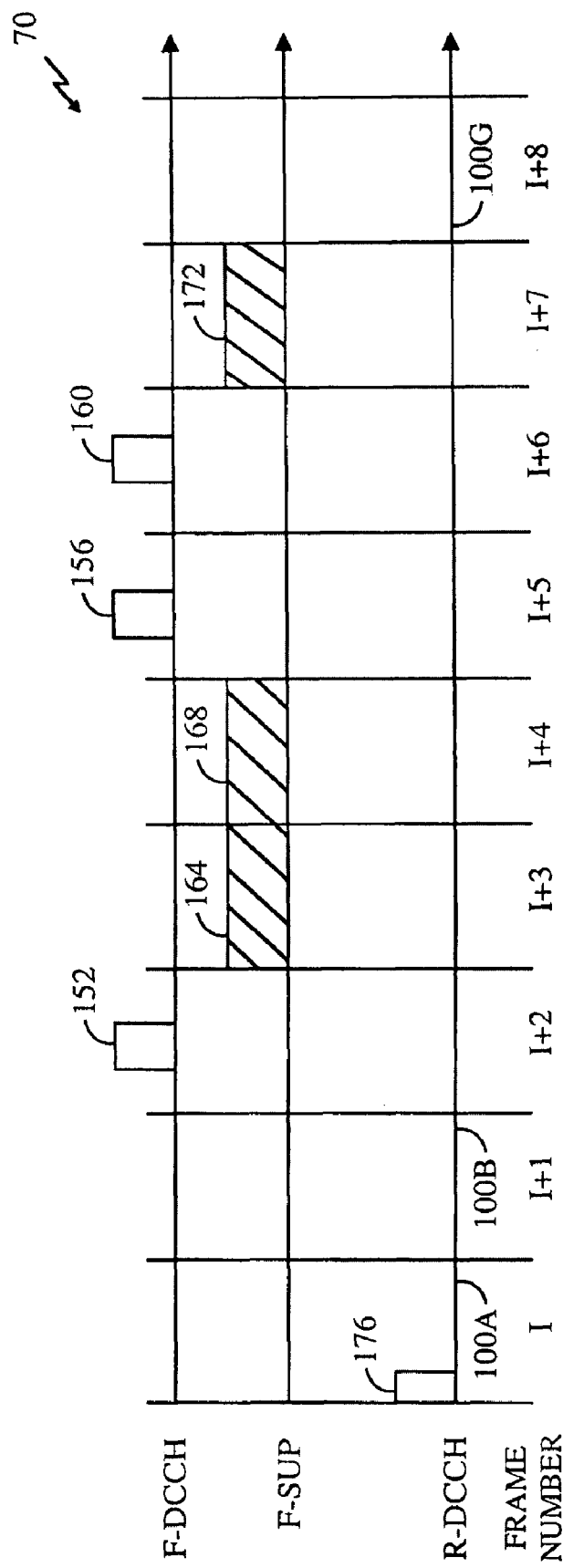
FIG. 7 shows a scheduling time line of a negative acknowledgment protocol between a base station and a mobile station of a communication system suitable for implementation in the system of the present invention.

FIG. 7 shows a graphical representation 70. The graphical representation 70 sets forth a scheduling time line of a negative acknowledgement protocol on a reverse link between a base station and a mobile station of a communication system suitable for use with the present invention. The negative acknowledgement protocol of the graphical representation 70 can be used in a power control method as set forth above.

Most of the timing and the acknowledgement structure of the reverse link operates in the same manner as described with respect to the forward link. An exception is the following. In the reverse link, the mobile station requests permission to transmit the high rate ABR frames 164, 168 by means of the request 176. The base station informs the mobile station when to send ABR frames 164, 168 by means of an assignment message 152. The mobile station of the graphical representation 70 is not required to request retransmission of an erred frame 164. However the base station knows that the frame 164 is in error and schedules a retransmission when the reverse link has available capacity. Furthermore, a negative acknowledgement message 156 transmitted by the base station can include permission to retransmit a reverse link power frame 172 and the slot in which it is transmitted.

The alternative embodiments previously described above with respect to the forward link can also be applied to the reverse link. For example, in one embodiment of the reverse link, the mobile station is not required to request transmissions using the MAC message 176. Furthermore, the base station is not required to grant access to the channel using the MAC messages 152. In another embodiment, the base station is not required to explicitly inform the mobile station using message 176 of the frame in which to retransmit the message.

Figure 8:
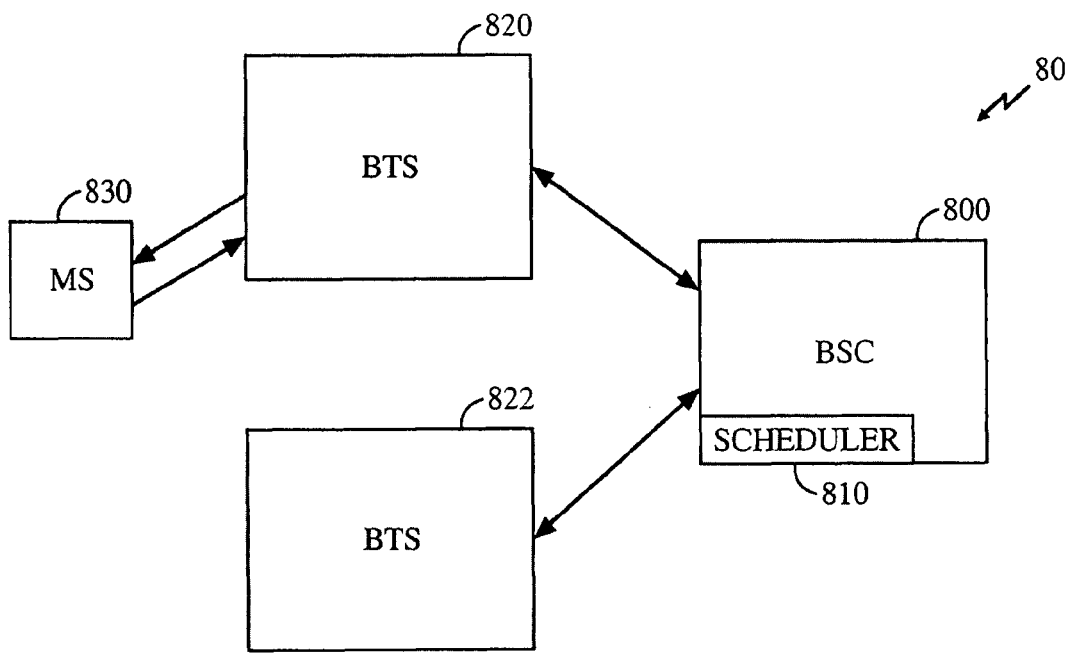
FIG. 8 is a block diagram showing a base station controller that includes a scheduler for allocating forward link power among different traffic streams in accordance with the present invention.

Referring now to FIG. 8, there is a block diagram showing a base station controller (BSC) 810 that includes a scheduler 812 for allocating forward link power among different traffic streams in accordance with one embodiment of the present invention. The various policies for allocating power to the ABR transmission streams may be implemented in software using scheduler 812. Operation of a scheduler that may be modified to include software for allocating power in accordance with the present invention is disclosed in U.S. patent application Ser. No. 08/798,951 entitled "NEW AND IMPROVED METHOD FOR FORWARD LINK RATE SCHEDULING," which is owned by the assignee of the present invention and the contents of which are hereby incorporated herein by reference. In the embodiment shown in FIG. 8, BSC 800 determines the power allocation for each of the data streams being transmitted, this power allocation information is then transmitted to base station transceiver systems (BTSs) 820, 822, which in turn transmit the various data streams to one or more mobile stations 830 in accordance with the power allocation determinations made at scheduler 810.

Figure 9:
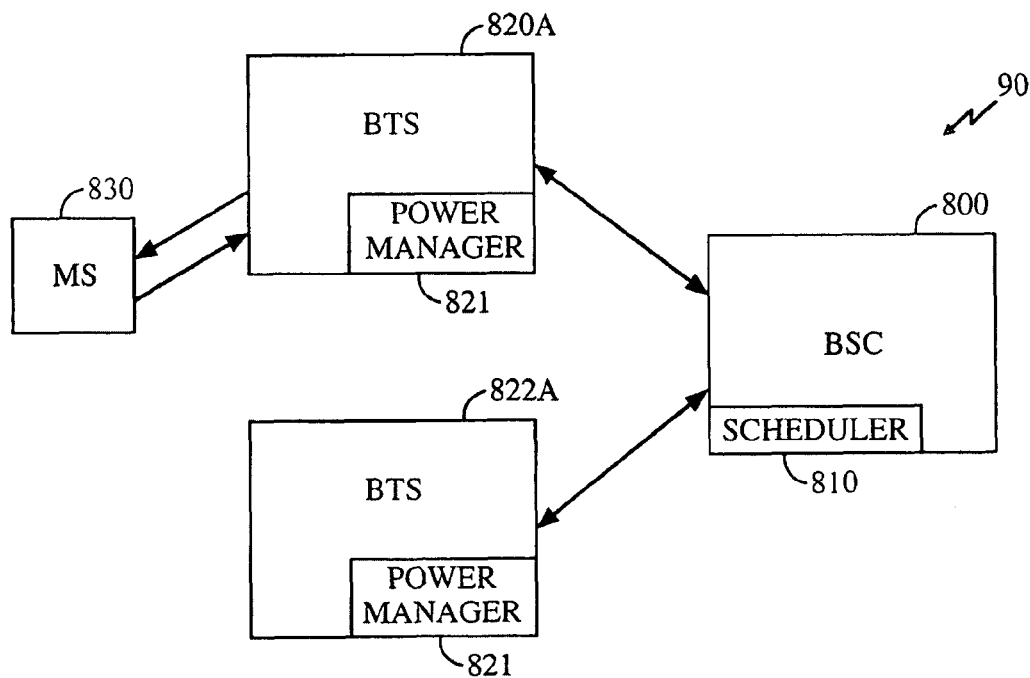
FIG. 9 is a block diagram showing two base station transceivers that each include a power manager for allocating forward link power among different traffic streams in accordance with the present invention.

Referring now to FIG. 9, there is a block diagram 90 showing two base station transceivers 820a, 822a that each includes a power manager 821 for allocating forward link power among different traffic streams in accordance with an alternative embodiment of the present invention. The embodiment shown in FIG. 9 is useful in cases where fast forward power control is being applied, because in this embodiment the power allocation determinations are made at the BTS's (rather than at the BSC 800), thereby eliminating the delay resulting from transmission of the powers being transmitted on the forward link from the BTSs to the BSC and the power allocation information from BSC 800 to the BTSs. In the embodiment shown in FIG. 9, the various policies for allocating power to the ABR transmission streams may be implemented in software using power managers 821. Each power manager 821 determines the power allocation for each of the data streams being transmitting by the corresponding BTS, and the BTS then transmits the various data streams to one or more mobile stations 830 in accordance with the power allocation determinations made by power manager 821. In another embodiment, the scheduler 810 in the BSC can set some general power allocation policy that the power managers 821 in the BTSs carry out. This has the advantage that the power managers 821 can handle short term fluctuations without encountering the delay between the BTS and the BSC and provides a consistent scheduling policy over all data streams.

In summary, different scheduling policies are possible during the transmissions of time frames 18a-f. A frame scheduling policy is a set of rules for determining which of a plurality of signals waiting to be transmitted are actually inserted into a frame. In one scheduling policy, a base station can transmit the traffic streams that are likely to be received at sufficient power by the intended receiving mobile station. Alternately, a scheduling policy can be used wherein the forward link is transmitted with sufficient power for correct demodulation by the intended receiving mobile station on the first transmission. In an alternate embodiment, the base station can allocate power to a number of different streams such that none of the streams are transmitted with enough power to allow reliable decoding by the receiver without at least one retransmission, as previously described. The transmission rate and the code rate of the transmitted stream are among the other parameters that the base station can adjust in this case. Furthermore, one embodiment of the invention is directed to the case wherein a mobile station has insufficient power to transmit all of the bit streams. In this case, the mobile station can reduce the transmitted power on the R-SCH in an attempt to maintain the R-FCH and R-DCCH at the required power level. This method is similar to the one used for the forward link. Since the base station receives some power from the mobile station, the amount of power required during the retransmission is less. It will be understood that all of the methods disclosed herein can be used at the time of call set up or at any time during a transmission after set up.

The previous description of the preferred embodiments is provided to enable a person skilled in the art to make or use the present invention. The various modifications to these embodiments will be readily apparent to those skilled in the art, and the generic principles defined herein can be applied to other embodiments without the use of the inventive faculty. Thus, the present invention is not intended to be limited to the embodiments shown herein but is to be accorded the widest scope consistent with the principles and novel features disclosed. It should be further noted that the paragraphs and subparagraphs within the claims are identified with letter and number designations. These designations do not indicate the order of importance of the associated limitations or the sequential order in which steps should be performed.

What is claimed is:

1. A method for transmitting information in a communication system, the method comprising the steps of
    determining power allocation for each scheduled traffic stream in each time frame of a plurality of time frames;
    identifying at least one portion of one or more time frames having available power capacity for transmitting at least a portion of at least one previously unscheduled traffic stream in addition to any traffic streams previously scheduled to be transmitted; and
    simultaneously transmitting from a transmitter the previously scheduled traffic streams and the portion of the previously unscheduled traffic stream during the identified portion of the one or more time frames.

2. The method of claim 1, wherein a sum of the power allocated to the scheduled and unscheduled traffic streams is no greater than a maximum power ceiling.

3. The method of claim 2, wherein the sum is substantially equal to the maximum power ceiling and the sum is maintained at a constant level over a plurality of time frames by repeating the steps of claim 2.

4. The method of claim 1, wherein at least a portion of one frame in the previously unscheduled set of traffic streams is intentionally transmitted at a first symbol energy that is insufficient for correct demodulation by an intended receiving station.

5. The method of claim 4, further comprising the step of retransmitting on the forward link at least one portion of the information previously transmitted at the first symbol energy amount, wherein the retransmitted portion is retransmitted with a symbol energy that is insufficient by itself for correct demodulation by the intended receiving station.

6. The method of claim 5, repeating retransmission of the retransmitted portion until the sum of the symbol energy received is great enough to permit correct demodulation of the retransmitted portion by the intended receiving station.

7. The method of claim 6, wherein the previously scheduled traffic streams includes at least one constant bit rate traffic stream and at least one variable bit rate traffic stream.

8. The method of claim 7, wherein frames in the constant bit rate traffic stream and frames in the previously unscheduled traffic streams are offset in time with respect to each other.

9. The method of claim 8, wherein frames in the previously unscheduled traffic streams include messages that have different lengths.

10. The method of claim 1, wherein a traffic stream from the previously unscheduled streams has a different frame length than a traffic stream from the previously scheduled steams.

11. The method of claim 10, wherein the further traffic stream is transmitted discontinuously.

12. The method of claim 11, wherein the previously unscheduled traffic stream has a lower priority than the previously scheduled traffic streams.

13. The method of claim 1, wherein frames in at least one of the previously scheduled traffic streams and frames in the at least one of the previously unscheduled traffic stream are offset in time with respect to each other.

14. The method of claim 13, wherein frames in at least one of the previously scheduled traffic streams and frames in the at least one of the previously unscheduled, traffic stream have different lengths.

15. The method of claim 1, wherein the communication system uses code division multiple access (CDMA) modulation.

16. An apparatus for transmitting information comprising:
    a controller that determines an output power level associated with simultaneously transmitting a first set of one or more traffic streams, compares the output power level with a maximum power ceiling, and identifies at least one time frame having available capacity for transmitting a portion of a second set of one or more traffic streams; and
    a transmitter that simultaneously transmits the first set of one or more traffic streams and the portion of the second set of one or more traffic stream during the at least one time frame.

17. An apparatus for transmitting information, comprising:
    means for determining an output power level associated with simultaneously transmitting a first set of one or more traffic streams;
    means for comparing the output power level with the maximum power ceiling;
    means for identifying at least one time frame having available capacity for transmitting a portion of a second set of one or more traffic streams; and
    means for simultaneously transmitting the first set of one or more traffic streams and the portion of the second set of one or more traffic stream during the at least one frame on the forward link.

18. An apparatus for transmitting information, comprising:
    means for determining power allocation for each scheduled traffic stream in each time frame of a plurality of time frames;
    means for identifying at least one portion of a one or more time frames having available power capacity for transmitting at least a portion of at least one previously unscheduled traffic stream in addition to any traffic streams previously scheduled to be transmitted; and
    means for simultaneously transmitting the previously scheduled traffic streams and the portion of the previously unscheduled traffic stream during the identified portion of the one or more time frames.

19. The apparatus of claim 18, wherein a sum of the power allocated to the scheduled and unscheduled traffic streams is no greater than a maximum power ceiling.

20. The apparatus of claim 19, wherein the sum is substantially equal to the maximum power ceiling and the sum is maintained at a constant level over a plurality of time frames by repeating the steps of claim 19.

21. A computer program product comprising:
  non-transitory computer-readable medium comprising:
    code for causing a computer to determine power allocation for each scheduled traffic stream in each time frame of a plurality of time frames;
    code for causing a computer to identify at least one portion of one or more time frames having available power capacity for transmitting at least a portion of at least one previously unscheduled traffic stream in addition to any traffic streams previously scheduled to be transmitted; and
    code for causing the computer to simultaneously transmit the previously scheduled traffic streams and the portion of the previously unscheduled traffic stream during the identified portion of the one or more time frames.

22. The computer program product of claim 21, wherein a sum of the power allocated to the scheduled and unscheduled traffic streams is no greater than a maximum power ceiling.

23. The computer program product of claim 22, wherein the sum is substantially equal to the maximum power ceiling and the sum is maintained at a constant level over a plurality of time frames by repeating the steps of claim 22.

* * * * *